United States Patent [19]

Kitamura

[11] Patent Number: 4,809,422

[45] Date of Patent: Mar. 7, 1989

[54] MACHINE TOOL WITH INDEX MEANS

[75] Inventor: Koichiro Kitamura, Takaoka, Japan

[73] Assignee: Kitamura Machinery Co., Ltd., Toyama, Japan

[21] Appl. No.: 904,373

[22] Filed: Sep. 8, 1986

[30] Foreign Application Priority Data

Sep. 11, 1985 [JP] Japan .................................. 60-199598

[51] Int. Cl.⁴ .......................... B23Q 3/157; B23Q 7/14

[52] U.S. Cl. ...................................... 29/568; 29/33 P; 29/563

[58] Field of Search ............. 29/568, 26 A, 563, 33 P; 409/145, 158, 161, 163, 165, 167, 168, 174, 198, 219, 221, 223, 224, 225, 226, 241

[56] References Cited

U.S. PATENT DOCUMENTS 1,414,970 5/1922 Nelson ................................ 409/168
3,267,550 8/1966 Whittum et al. ............... 409/221 X
3,550,487 12/1970 Randall et al. .................. 29/568 X
3,824,892 7/1974 Bondie et al. ....................... 409/167
4,484,387 11/1984 Nachmany .......................... 409/219
4,529,342 7/1985 Babel .............................. 409/221 X
4,608,747 9/1986 Link et al. ............................ 29/568

*Primary Examiner*—Z. R. Bilinsky
*Attorney, Agent, or Firm*—Wegner & Bretschneider

[57] ABSTRACT

A machine tool body (1) is equipped with a spindle (9) which can move vertically along the Y axis. A first table (14) on a bed (10) of the machine tool body (1) is movable horizonally in the Z direction and can move toward the tool (11) held by the spindle (9). A second table (15) set on the first table (14) can move in a horizontal direction at a right angle to the moving direction of the first table (14). A first rotary table (16) set on the second table 15 can be indexed about the rotation axis (RO) and has an extension portion (17) extending upwardly. The second rotary table (19) set on a side surface (16) of the extension portion (17) can be indexed about a rotation axis (QO) while it holds fixedly a workpiece (W). A workpiece feeding means (4) is used to load a workpiece (W) onto the second rotary table (19) and after machining thereof unload each workpiece (W) for the second rotary table (19).

3 Claims, 9 Drawing Sheets

1 7 2 3 5 4 22 29 36 26 W 17 19 23 21

3
2
7
17
19
1
5
29
22
36
W
26
23
4
21

1
2
3
4
5
6
7
16
17
19
21
22
25
26
29
31
36
49
49a
W

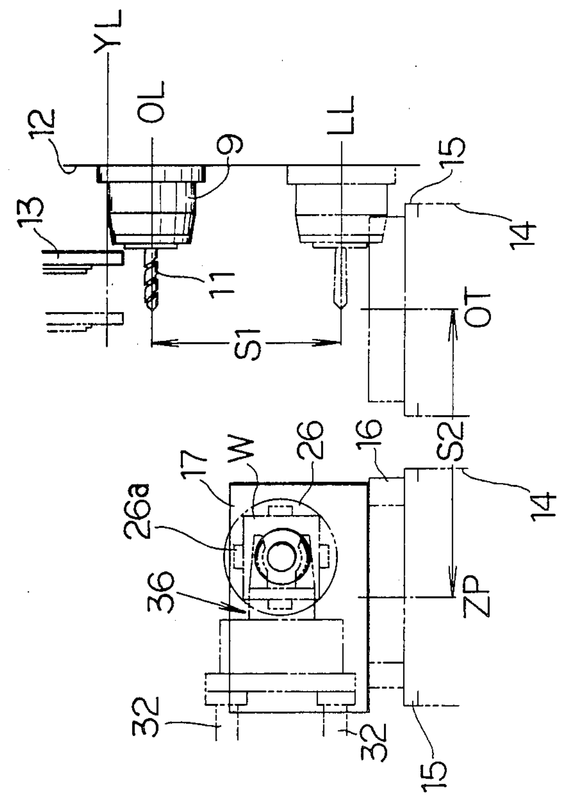
Fig.4
YL
OL
LL
12
9
13
11
S1
15
14
OT
S2
16
17
W
26
26a
36
ZP
32
15
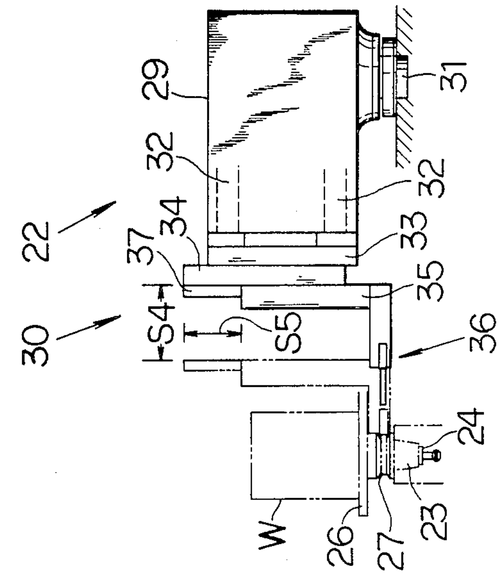
22
30
29
32
34
37
33
35
S4
S5
36
31
24
23
27
26
W 9
12
16
11
26
26a
28
23
S3
19
20
W
16
17
17a
16
OM
36
32
35
X-Z
31
22
29
J
32
33
37
34
30
35
37
36
26
W

MACHINE TOOL WITH INDEX MEANS

BACKGROUND OF THE INVENTION

This invention relates to a machine tool with index means in which five sides or surfaces of a workpiece can be machined in sequence once the workpiece is attached to a spindle thereof.

Assuming that five flat surfaces of a workpiece in the form of a rectangular parallelepiped are sequentially machined, the workpiece is attached to an index means in a machine tool. The index means is then rotated by a given angle of 90° to the correct position for the machine tool to perform a required operation. The workpiece is located in a precise position for one operation and then rotated to a second precise position for a second operation. Whenever such an index operation is repeated, each of four side surfaces of the workpiece is machined. In order to machine a fifth surface of the workpiece which is an end surface, however, the workpiece must be removed from the index means of the machine tool and then attached to a table of another machine tool. After that, the fifth end surface of the workpiece is machined.

Accordingly, the workpiece must be twice attached and removed in order to carry out one sequential operation on the workpiece.

OBJECT OF THE INVENTION

The object of this invention is to provide a machine tool with an index means in which five sides or surfaces of a workpiece can be sequentially machined once the workpiece is attached to the index means.

BRIEF DESCRIPTION OF THE DRAWINGS

FIG. 4 is a schematic front view showing a relationship among a spindle, a first rotary table and a workpiece feeding means;

BRIEF DESCRIPTION OF THE PREFERRED EMBODIMENTS

Figure 1:
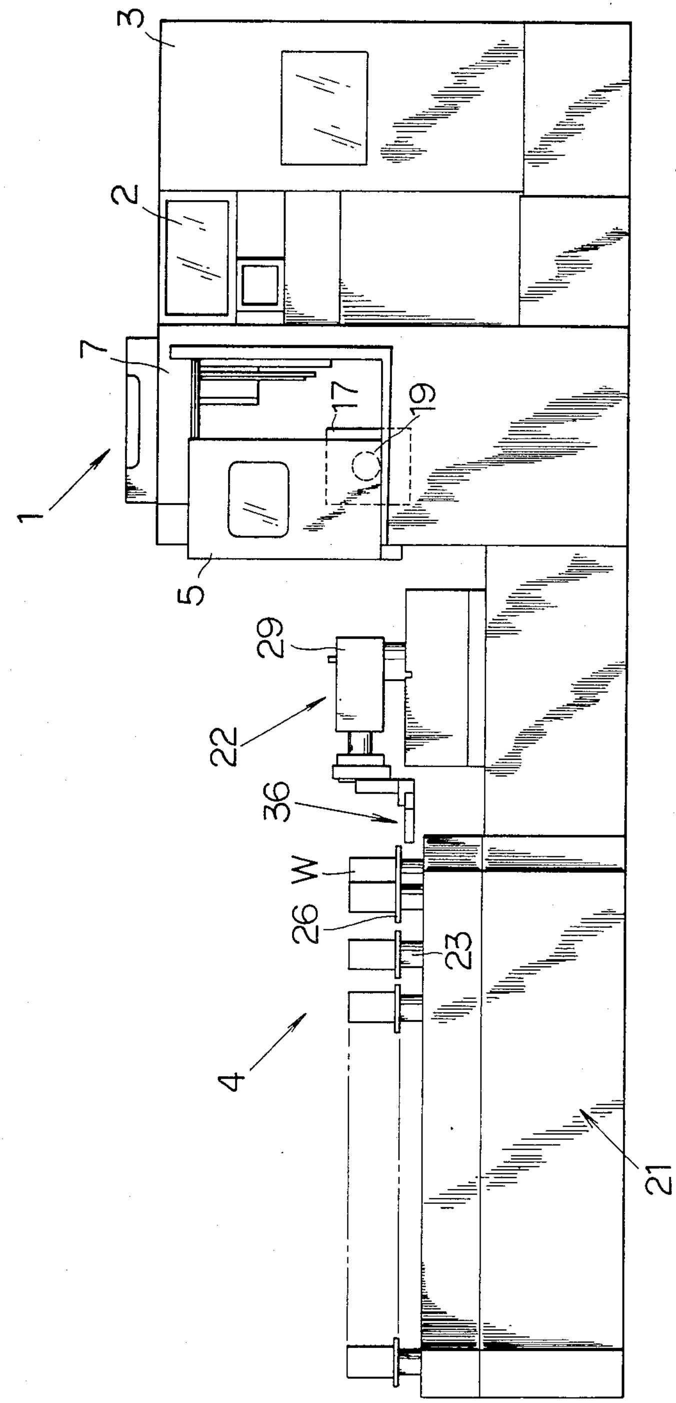
FIG. 1 is a front view showing a machine tool with index means according to a preferred embodiment of this invention.
Figure 2:
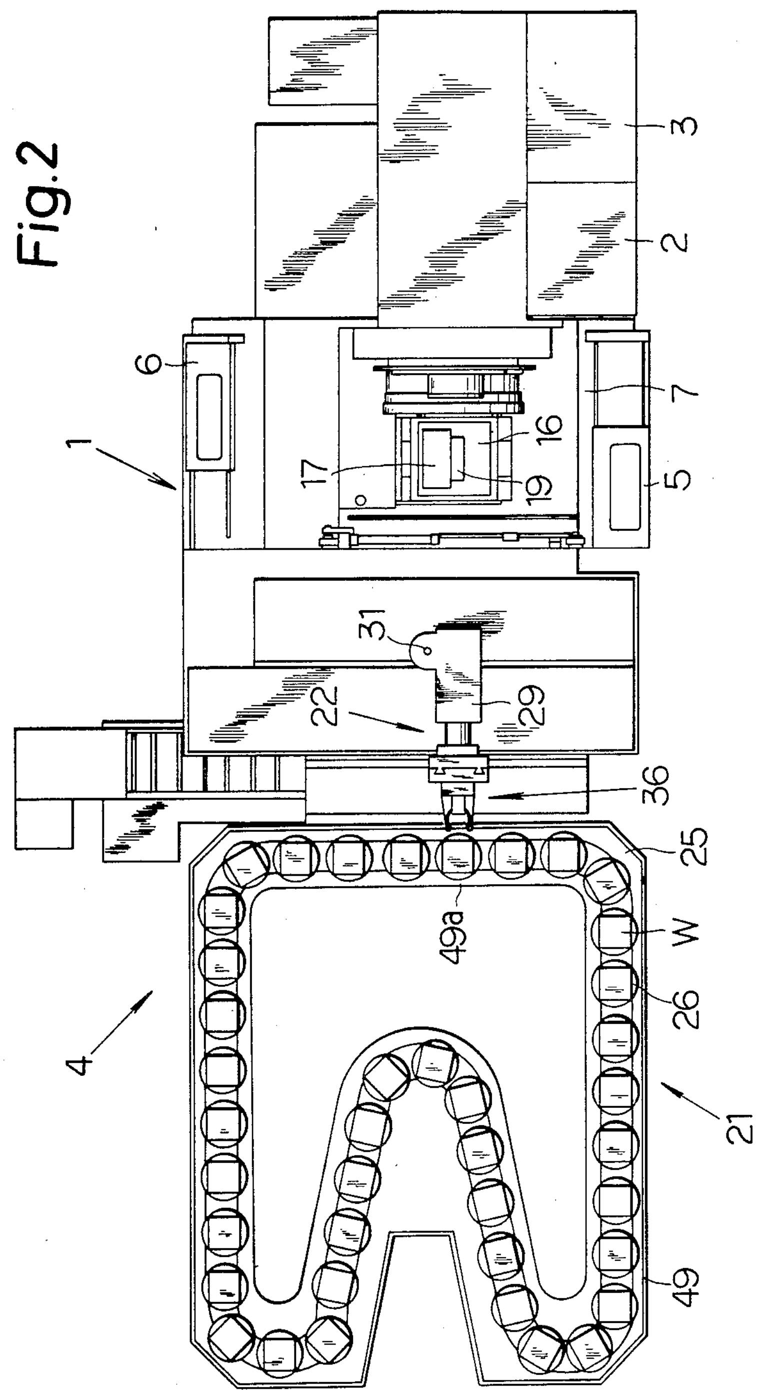
FIG. 2 is a plane view of the machine tool with index means shown in FIG. 1.
Figure 3:
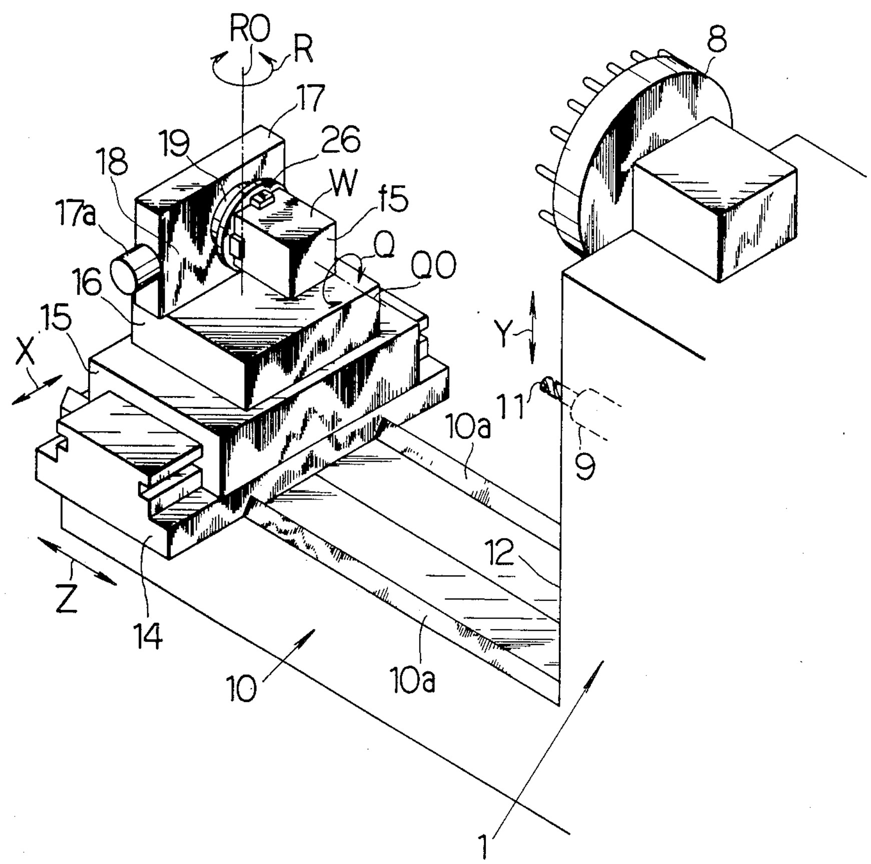
FIG. 3 is a perspective view showing an essential portion of the machine tool with index means shown in FIG. 1.

Referring to FIG. 1 through FIG. 3, a machine tool body 1 is equipped with a spindle 9 which can move vertically in the direction of an arrow Y in FIG. 3. A first table 14 is provided on a bed 10 of the machine tool body 1 and movable horizontally in the direction of an arrow Z in FIG. 3. The first table 14 can move toward a tool 11 attached to the spindle 9. A second table 15 is set on the first table 14 and can move in a horizontal direction at a right angle to the moving direction of the first table 14. A first rotary table 16 set on the second table 15 can be indexed about the rotation axis RO. The first rotary table 16 has an extension portion 17 extending upwardly. A second rotary table 19 is set at a side surface 16 of the extension portion 17 and can be indexed about a rotation axis QO in a direction Q. The second rotary table 19 is to hold fixedly a workpiece W.

A workpiece feeding means 4 is used to load the workpiece W onto the second rotary table 19 and, after machining thereof, unload each workpiece W from the second rotary table 19.

DETAILED DESCRIPTION OF THE PREFERRED EMBODIMENTS

Referring now to FIGS. 1 and 2, a machine tool with an index means according to this invention is preferably of a horizontal machining center type. A machine tool body 1 is equipped with an operation panel 2, a NC machine 3 and a workpiece feeding means 4. A chip guard 7 covers the machine tool body 1 and has a door 5.

As shown in FIGS. 3 and 4, the machine tool body 1 is also equipped with an automatic tool changer 13, a tool magazine 8, a spindle 9 and a bed 10.

A tool 11 attached to the spindle 9 can be replaced by any one of other tools set on the tool magazine 8 by means of the automatic tool changer 13. One example of the tool 11 is a drill.

As shown in FIGS. 3 and 4, the spindle 9 holding the tool 11 can move vertically along the stroke S1 from a lower level LL to an upper level OL by means of a motor (not shown) equipped in the spindle 9 and a feeding mechanism (not shown) in the direction Y. The upper level OL corresponds to the initial machine level. When the tool 11 is to be exchanged to another one, the spindle 9 moves up to a tool exchange level YL.

A first table 14 is slidably set on a pair of rails **10*a* of the bed 10 in such a manner that the first table 14 can move horizontally in the direction Z by means of an actuating means (not shown) equipped therein and a feeding mechanism (not shown). The first table 14 can move toward the tool 11 attached to the spindle 9. The first table 14 is also movable along the stroke S2** between the initial machine position ZP and the end position OT.

Figure 5:
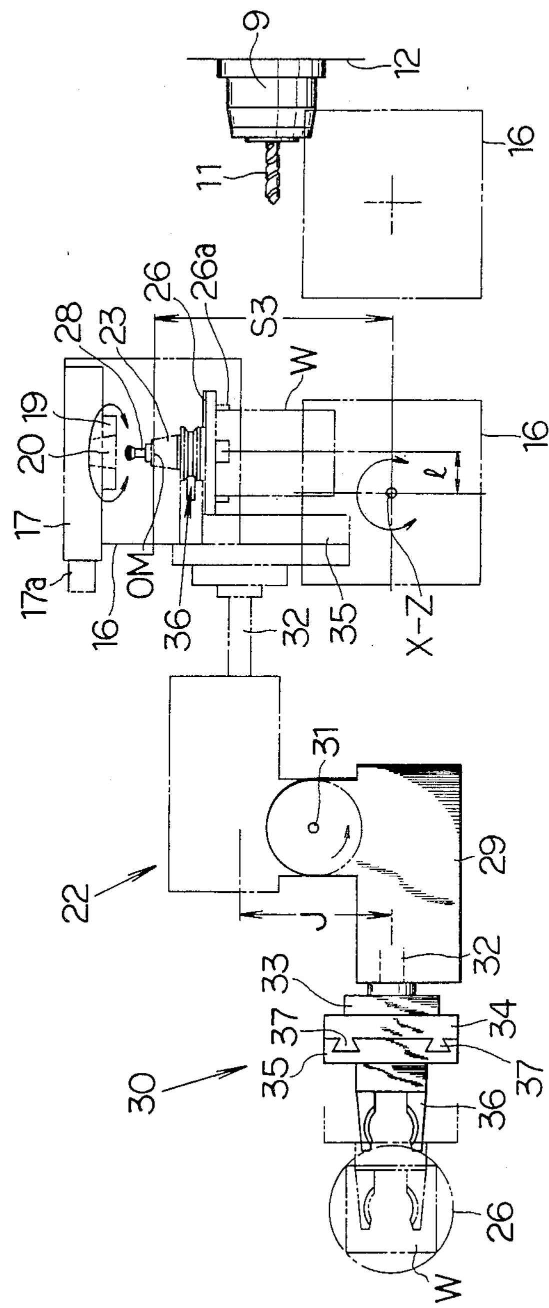
FIG. 5 is a plane view showing a relationship among a spindle, a first rotary table and a workpiece feeding means.

A second table 15 is slidably set on the first table 14 in such a way that the second table 15 can move in the direction X which is at a right angle to the axis Z and in parallel to a horizontal plane, by means of a motor (not shown) equipped therein and a feeding mechanism (not shown). As shown in FIG. 5, the second table 15 is movable along the stroke S3 between the initial machine position X-Z and the end position OM.

A first rotary table 16 is rotably set on the second table 15 in such a way that the first rotary table 16 can be indexed in the rotation direction R about the rotation axis RO. The initial machine position X-Z can be set so as to coincide with the rotation axis RO.

The first rotary table 16 can be rotated for the indexing purpose at each one degree by means of a motor (not shown) equipped therein and an index mechanism (not shown).

The first rotary table 16 has an extension portion 17 extending upwardly. A second rotary table 19 is set onto a side portion 18 of the extension portion 17 in such a way that the second rotary table 19 can be indexed in the rotation direction Q about the rotation axis QO.

The second rotary table 19 can be rotated at each one degree for the index purpose by means of a motor 17*a* and an index mechanism (not shown) equipped therein.

The second rotary table 19 can be constructed of a collet chuck type or an electromagnet type. The second rotary table 19 has at its center a tapered opening 20 into which a workpiece holder 23 can be inserted as shown in FIGS. 4 and 5.

The second rotary table 19 holds the workpiece holder 23 by means of a collet chuck or an electromagnet chuck. The workpiece holder 23 can be easily removed from the second rotary table 19 if it is released.

The motors for the first and second tables 14, 15 are electorically connected to the NC machine 3. The moving distance and moving direction of the first and second tables 14, 15 in the X and Z axises are controlled according to the programs of the NC machine 3. Also, the motors for the first and second rotary tables 16, 19 are electrically connected to the NC machine 3. The index angle and rotation direction of the first and second rotary tables 16, 19 are controlled according to the programs of the NC machine 3.

A motor (not shown) for actuating vertically the spindle 9 in the direction Y is electrically connected to the NC machine. The moving distance and moving direction of the spindle 9 in the direction Y are controlled according to the programs of the NC machine 3. The on-off timing of the second rotary table 19 is controlled according to the programs of the NC machine 3.

Referring back to FIGS. 1 and 2, the workpiece feeding means 4 includes a work station 21 and an automatic workpiece changer 22. The workpiece feeding means 4 is used to load each of many workpieces W set in the work station 21 onto the second rotary table 19 and, after machining thereof, unload each workpiece W from the second rotary table 19.

Figure 6:
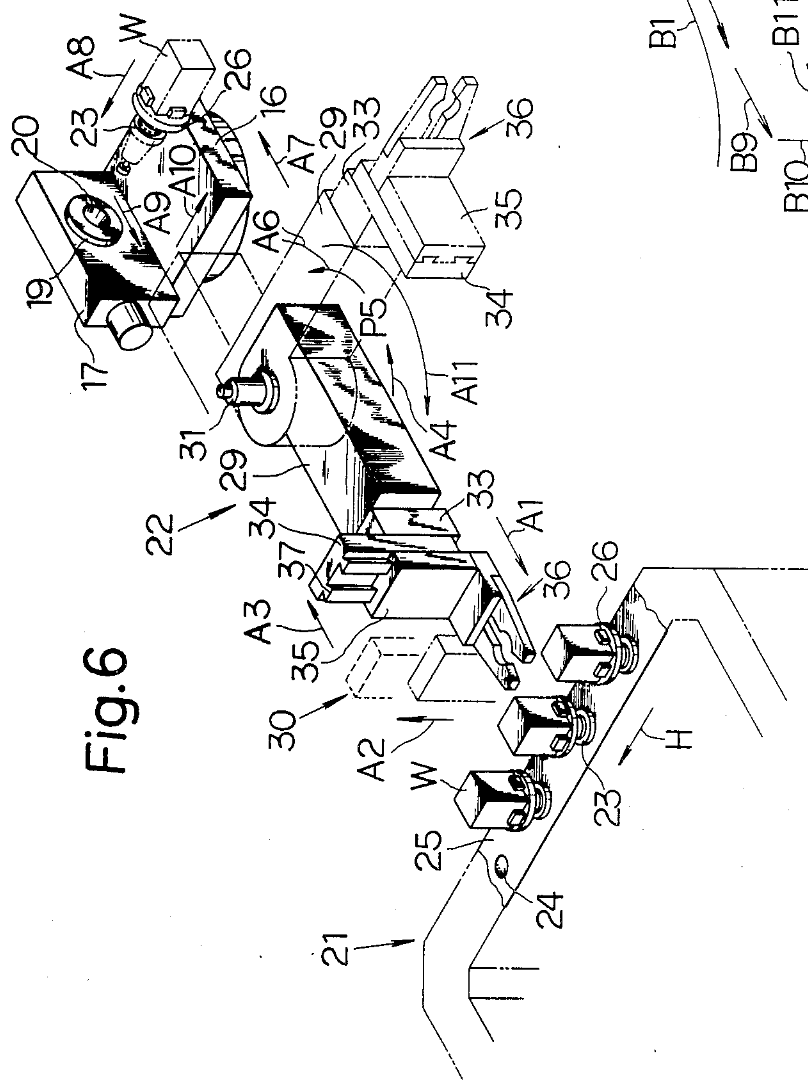
FIG. 6 is a perspective view showing a workpiece feeding means, a first rotary table and a second rotary table.
Figure 7:
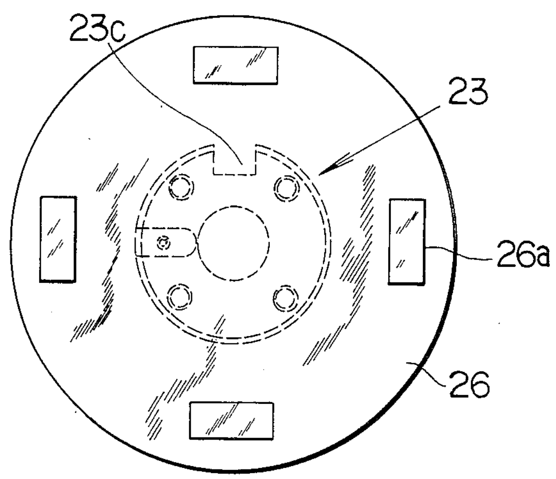
FIG. 7 is a plane view showing a workpiece holder and a disk.
Figure 8:
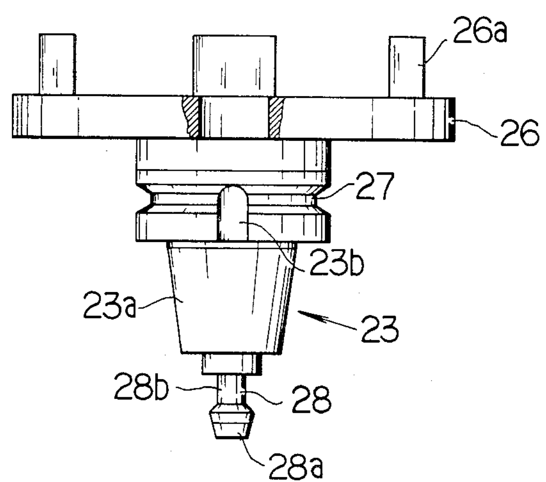
FIG. 8 is a front view showing, with some portion thereof being broken out, a workpiece holder and a disk.

An endless type conveyer 25 in the work station 21 has a plurality of setting openings 24 shown in FIGS. 4 and 6. A metal disk 26 is fixed to an upper portion of the workpiece holder 23 as shown FIGS. 7 and 8.

Four workpiece fixing members 26*a* are fixed on the upper surface of the disk 26 at regular intervals. These workpiece fixing members 26*a* contact a first surface fl through a fourth surface f4 of the workpiece W, respectively, with some friction so that the workpiece W can be attached to the disk 26.

A circular groove 27 is formed in an intermediate portion of the workpiece holder 23. A pull stud 28 is attached to a lower portion of the workpiece holder 23. The pull stud 28 is to be inserted into the opening 20 of the second rotary table 19 and the opening 24.

As shown in FIG. 2, a workpiece W is attached to each of plural disks 26 of the workpiece station 21. The conveyer 25 of the work station 21 is actuated by an actuating means (not shown). Actuating timing of the conveyer 25 is controlled according to the programs of the NC machine 3. The motion of the automatic workpiece changer 22 is controlled according to the programs of the NC machine 3.

As shown in FIGS. 4 and 6, the automatic workpiece changer 22 includes a changer body 29 and an operation portion 30 attached thereto. The changer body 29 can be rotated about the vertical axis 31 by 180 degrees. If it turns by 180 degrees, a rod 32 moves back along the stroke J in FIG. 5.

The operation portion 30 can extend along the stroke S4 from the changer body 29 through plural rods 32 by means of an actuating means (not shown) equipped in the changer body 29, as shown in FIG. 4. A plate 33 of the operation portion 30 is fixed to each front end of the rods 32. An arm support 35 is attached by way of a support 34 to the plate 33.

An arm 36 is horizontally attached to a lower end of the arm support 35. An end portion of the arm 36 is formed so as to be set in the groove 27 of the workpiece holder 23. The arm support 35 can move vertically along the stroke S5 slidably on a rail 37 of the support 34 by way of an actuating means (not shown), as shown in FIG. 4.

As shown by dotted lines in FIG. 6, the support 34, the arm support 35 and the arm 36 can counterclockwisely rotate by 90 degrees with respect to the plate 33 by means of a rotation mechanism and an actuating means (not shown).

Figure 9:
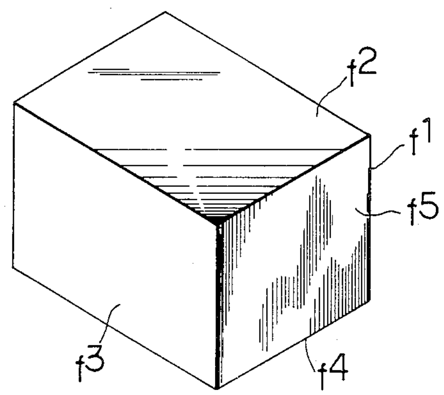
FIG. 9 is a perspective view showing one example of a workpiece.

Assuming that a workpiece W of a rectangular parallelepiped shape shown in FIG. 9 is to be machined, a fifth end surface F5 of the workpiece W is square. According to the programs of the NC machine 3, the first surface fl through the fifth surface f5 of the workpiece W is drilled by the tool 11.

First, as shown in FIG. 5, the first table 14 moves from the initial machine position X-Z toward the tool 11 attached to the spindle 11 in the direction Z by a predetermined distance 1. Next, the second table 15 moves along the stroke S3 so as to come to the end position OM.

After that, the first rotary table 16 is clockwisely indexed by 90 degrees from the condition of FIG. 3 so that the rotation axis QO of the second rotary table 19 becomes parallel to the X axis.

Accordingly, the first and second rotary tables 16, 19 are set in a condition shown in FIGS. 4 and 5. This is an initial setting position.

The motion of the automatic workpiece changer 22 will be described, referring to FIGS. 4 through 6.

The rod 32 of the automatic work changer 22 extends along the stroke S4 in the direction of the arrow A1 so that the arm 36 is set in the groove 7 of the workpiece holder 23 of the work station 21. As the arm support 35 moves up along the stroke S5, the work holder 23 is forcedly picked up from the opening 24 of the conveyer 25 in the direction of the arrow A2. While the arm 36 holds the workpiece holder 23 holding the workpiece W, the rod 32 contracts along the stroke S4 in the direction of the arrow A3.

Next, the changer body 29 rotates in the directions of the arrows A4, A6 by 180 degrees. During such rotation of the changer body 29, the support 34 and the arm support 35 rotate counterclockwisely by 90 degrees. They come to the position P5 shown by dotted lines in FIG. 6 although the workpiece W and the workpiece holder 32 are not shown for the purpose of simplifying the figure. As a result, the workpiece W is horizontally set.

When the changer body 29 is rotated in the direction of the arrow A6, the arm 36 and the workpiece holder 23 come near the second rotary table 19. The rod 32 again extends along the stroke S4 in the direction of the arrow A7. The workpiece holder 23 and the workpiece W held by the arm 36 are positioned in front of the second rotary table 20 as shown in FIGS. 4 and 5. The central axis of the workpiece holder 23 coincides with the center of the opening 20.

The arm support 35 moves along the stroke S5 in the direction A8 so that the pull stud 28 of the workpiece holder 23 is inserted into the opening 20. When the rod 32 contracts along the stroke S4, the arm 36 is removed from the workpiece holder 23 in the direction of the arrow A9. As a given attaching force of the second rotary table 19 is produced, the workpiece holder 23 is surely attached to the second rotary table 19. After the arm support 35 again moves along the stroke S5 in the direction of the arrow 10, the changer body 29 reversely rotates by 180 degrees in the direction of the arrow A11. Thus, the arm 36 is returned toward the work station 21.

Referring again to FIGS. 4 and 5, the first table 14 moves toward the spindle 9, and the second table 15 moves fortwardly from the end position OM in the direction X. The first surface f1 of the workpiece W faces the tool 11 (FIGS. 9 and 10).

At that time, the tool 11 is already set in such a position that the first surface fl of the workpiece W can be machined.

Figure 10:
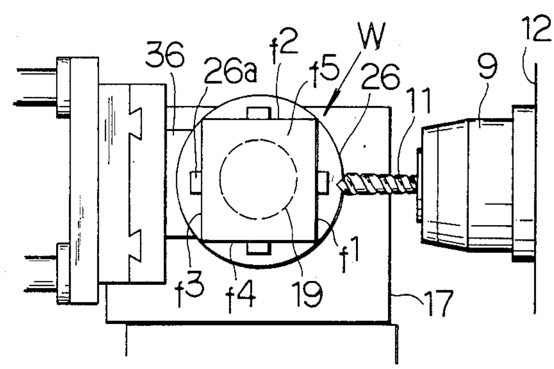
FIG. 10 is an explanatory view showing a condition in which a first surface of a workpiece is just to be machined.

Referring to FIGS. 3 and 10, the first table 14 further moves toward the tool 11 attached to the spindle so as to drill the first surface f1 by a predetermined depth. After that, the first table 14 moves back. After the second rotary table 19 is counterclockwisely indexed by 90 degrees, the second surface f2 is set in a precise position. The first table 11 again moves toward the tool 11, and the second surface f2 is machined by a predetemined depth. In a similar way, the third surface f3 and the fourth surface f4 are drilled.

When the first surface f1 through the fourth surface f4 have been completely machined, the first table 14 moves back.

After that, the first rotary table 16 is indexed about the rotation axis RO by 90 degrees so that the fifth surface f5 of the workpiece W faces the tool 11 as shown in FIG. 3. The first table 14 again moves forward and drills the fifth surface f5 by a predetermined depth.

As can be seen from the foregoing, once the workpiece W is attached to the second rotary table 19, the first surface f1 through the fifth surface f5 of the workpiece W can be sequentially machined.

After the workpiece W is completely machined, the first and second tables 14 and 15 are returned to their initial setting positions (FIGS. 4 and 5).

Figure 11:
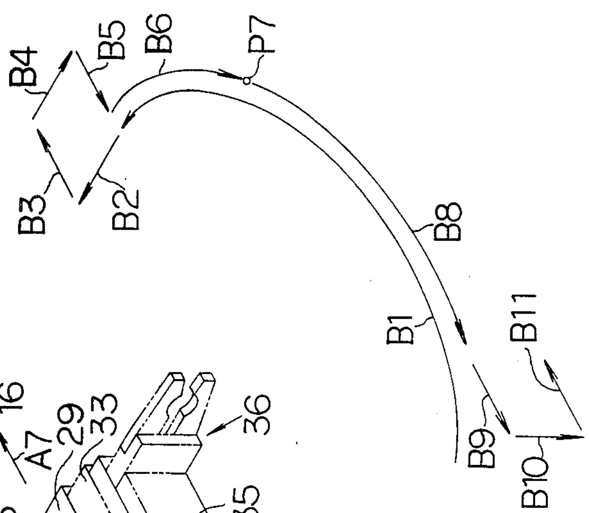
FIG. 11 is an explanatory view showing a condition in which a workpiece is unloaded from a second rotary table.

Referring to FIGS. 6 and 11, the steps of unloading the machined workpieces W to the work station 21 will be explained.

The arm 36 is positioned near the workpiece station 21 after it is rotated by 180 degrees in the direction of the arrow A11. First, the changer body 29 is rotated counterclockwisely by 180 degrees in the direction of the arrow B1. Next, the arm support 35 moves along the stroke S5 toward the second rotary table 19 in the direction of the arrow B2. Further, the rod 32 extends in the direction of the arrow B3. The arm 36 is set in the groove 27 of the workpiece holder 23. In this condition, the holding force of the second rotary table 19 disappears. If the arm support 35 moves along the stroke S5 in the direction of the arrow B4, the work holder 23 is released from the second rotary table 19 as shown in FIG. 5.

After that, the rod 32 contracts in the direction of the arrow B5, and then the changer body 29 is clockwisely rotated by 180 degrees in the directions of the arrows B6 and B8. During such rotation of the changer body 29, at the position P7, the support 34 and the arm support 35 are rotated clockwisely by 90 degrees with respect to the plate 34 so that the workpiece W is vertically set.

The rod 32 again extends in the direction of the arrow B9 in such a way that the workpiece holder 23 comes over a selected opening 24 of the conveyer 25.

When the arm support 35 moves down along the stroke S5 in the direction of the arrow B10, the pull stud 28 of the workpiece holder 23 is inserted into the opening 24. After that, the rod 32 contracts in the direction of the arrow B11 so as to remove the workpiece holder 23 from the arm 36.

Accordingly, the steps of loading, machining and unloading one workpiece W are completed.

A new workpiece W to be machined is set in such a position as to face the arm 36 by actuating the conveyer 25 in the direction of the arrow H in FIG. 6. Each workpiece W is first loaded onto the second rotary table 19 and after machining thereof unloaded from the second rotary table 19 and then returned to the work station 21.

Figure 12:
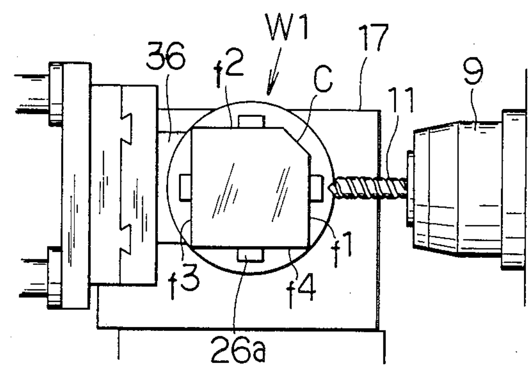
FIGS. 12 and 13 are explanatory views showing how a corner portion of a workpiece is machined.
Figure 13:
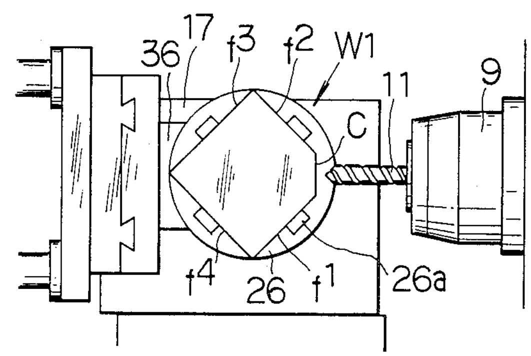

In some exceptional case, in addition to the first surface f1 through the fifth surface f5 of the workpiece W, a corner portion C of the workpiece W is machined. In such a case, as shown in FIG. 12, the second rotary table 19 is indexed such that the first surface f1 faces the tool 11. Next, the second rotary table 19 is clockwisely indexed by 45 degrees so that the corner portion C becomes to face the tool 11. After that, the workpiece W moves toward the tool 11 so as to drill the corner portion C.

This invention is not limited to the above-stated embodiments. For instance, a longitudinal direction of the bed can be set at a right angle to the central axis of the spindle. The disk 26 can be made of a permanent magnet type.

What is claimed is:

1. A machine tool apparatus comprising:

a machine tool body;

a spindle for holding and rotating a tool supported by said machine tool body for rotation about a horizontal axis;

means for moving said spindle in a vertical direction;

a bed disposed horizontally of, and secured to, said machine tool body;

a first table slideably mounted on said bed for movement in a horizontal direction parallel to said axis;

a second table slideably mounted on said first table for movement in a horizontal direction perpendicular to said axis;

a first rotary table disposed on said second table, said first rotary table being indexed about a vertical axis and having an extension portion extending upwardly;

a second rotary table having a tapered opening for receiving a workpiece holder, said second rotary table being mounted on said extension portion of said first rotary table and indexed about a horizontal axis parallel to said first-mentioned horizontal axis; and workpiece feeding means including a workpiece station, and an automatic workpiece changer for loading a selected workpiece from said workpiece station onto said second rotary table and, after machining thereof, unloading the workpiece from said second rotary table and returning it to said workpiece station.

2. The apparatus of claim 1 further comprising a tool magazine disposed above said spindle for arranging a plurality of tools, and an automatic tool changer for changing the tools between said spindle and said tool magazine.

3. A machine tool apparatus comprising:

a machine tool body;

a spindle for holding and rotating a tool supported by said machine tool body for rotation about a horizontal axis;

means for moving said spindle in a vertical direction;

a bed disposed horizontally of, and secured to, said machine tool body;

a first table slideably mounted on said bed for movement in a horizontal direction parallel to said axis;

a second table slideably mounted on said first table for movement in a horizontal direction perpendicular to said axis;

a first rotary table disposed on said second table, said first rotary table being indexed about a vertical axis;

a second rotary table for holding a workpiece, said second rotary table being mounted on said first rotary tables and indexed about a horizontal axis parallel to said first-mentioned horizontal axis;

workpiece feeding means for feeding the workpiece onto said second rotary table including a workpiece station, and an automatic workpiece changer means for loading a selected workpiece from said workpiece station onto said second rotary table and, after machining thereof, unloading the workpiece from said second rotary table and returning it to said workpiece station;

said workpiece station including an endless type conveyor having a plurality of setting openings into which workpiece holders are set;

said automatic workpiece changer including a changer body rotatable about a vertical axis, a rod that extends or contracts relative to said changer body, a plate fixed to an end of said rod, a main support attached to said plate, an arm support vertically slideable on said main support, an arm supported by said arm support for gripping the workpiece holder, and means for rotating said arm support and said arm with respect to said plate whereby the workpiece holder gripped by said arm can move in four directions.

* * * * *